Oct. 17, 1933.　　K. ALMQUIST　　1,931,050

BEARING CONSTRUCTION

Filed Aug. 12, 1930

INVENTOR.
Karl Almquist.
BY
HIS ATTORNEY.

Patented Oct. 17, 1933

1,931,050

UNITED STATES PATENT OFFICE 1,931,050

BEARING CONSTRUCTION

Karl Almquist, Easton, Pa., assignor to Ingersoll-Rand Company, Jersey City, N. J., a corporation of New Jersey Application August 12, 1930. Serial No. 474,713

1 Claim. (Cl. 308—187)

This invention relates to bearings, but more particularly to a bearing construction adapted for shafts subjected to end thrust.

Heretofore, in devices of this character intended for use in connection with a pair of oppositely acting thrust bearings housed in the same container, it has been customary to provide the container or bearing cartridge with an integral lateral flange located intermediate the ends of the bore in the cartridge to form an abutment for the thrust bearings supporting the shaft. One objection to this type of construction is the multiplicity of machining operations required in the manufacture of the bearing cartridge.

The object of the present invention is to simplify the construction of bearing cartridges adapted for use with thrust bearings.

Other objects will be in part obvious and in part pointed out hereinafter.

Figure 1:
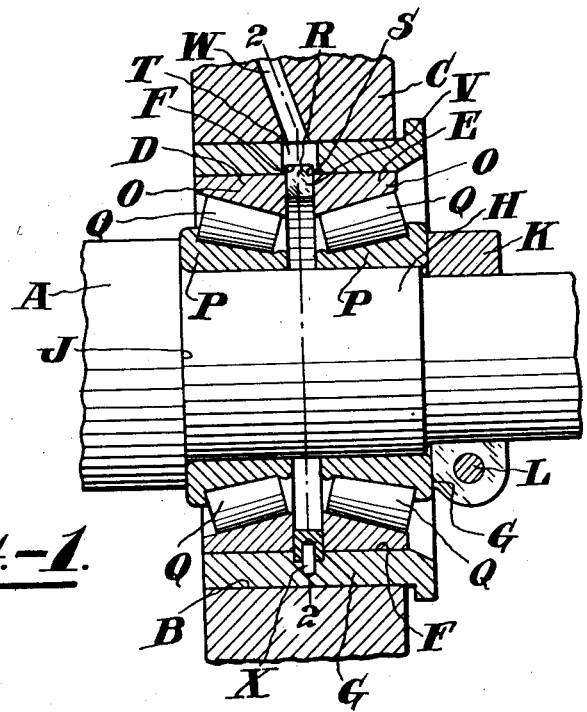
Figure 2:
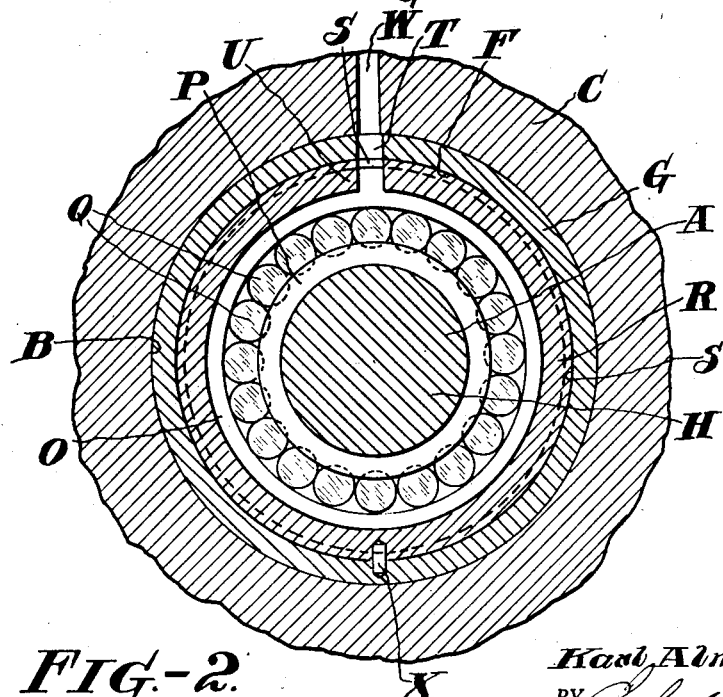

In the drawing illustrating the invention and in which similar reference characters refer to similar parts, Figure 1 is a longitudinal sectional elevation of a shaft and a frictionless bearing construction embodying the present invention, and Figure 2 is a transverse sectional view taken on the line 2—2 of Figure 1.

Referring to the drawing, A designates a rotatable shaft which is shown extending through the bore B of a bearing supporting member C which may be the casing of the machine of which the shaft A forms a part. The shaft A may be subjected to considerable end thrust in either direction during the operation of the machine and, in order to maintain the shaft and the parts attached thereto in substantially the correct position with respect to the stationary cooperating parts of the machine, thrust bearings D and E are employed to resist endwise movement of the shaft A. The thrust bearings D and E are disposed within the bore F of a bearing cartridge G to facilitate assembling of the bearings on the shaft A and also to provide a renewable support for the bearings.

The portion H of the shaft A which lies within the cartridge G may be of reduced diameter to form a shoulder J to serve as an abutment for the outer end of the bearing D. A split ring K may be clamped to the shaft A at the opposite end of the portion H as by means of a bolt L to provide an abutment for the outer end of the bearing E.

The bearings D and E may be of any well known type. As illustrated, each bearing comprises a pair of concentrically arranged outer and inner races which are designated by O and P respectively. The raceways formed by the races of each bearing converge toward the shaft A at the inner ends of the bearings and are adapted to receive truncated conical rollers Q disposed with their smaller ends at the inner or adjacent ends of the bearings. Due to this construction, end thrusts of the shaft A to the right, as viewed in Figure 1, will be transmitted to the inner race P of the bearing D by the shoulder J causing said inner race P to bear against the rollers Q of the bearing D which in turn will bear against the outer race O of the bearing D. End thrusts of the shaft A to the left will be transmitted to the outer race O of the bearing E by the split ring K and the inner race P and rollers Q of the bearing E.

In accordance with the present invention, the means employed to receive the end thrusts of the bearings is interlocked with the cartridge G and extends between the adjacent ends of the outer races O. Such means preferably comprises a split spring-ring R adapted to seat in an annular groove S opening from the bore F at a point intermediate the ends of the bore. The ring R may be a snug fit in the groove S and preferably possesses sufficient tension when seated to cause it to bear firmly against the bottom of the groove S. A substantial portion of the ring R extends into the bore F to space the bearings D and E from each other and to provide an abutment for the adjacent ends of the outer races O.

The forming of the bore F and the groove S in the cardtridge G are relatively simple and inexpensive operations. The ring R is of simple construction and forms an entirely satisfactory abutment.

Preferably means are provided for conveying lubricant to the bearings to assure the frictionless operation thereof. To this end a port T may be formed in the wall of the bearing cartridge G which is adapted to register with the gap between the ends U and V of the split ring R, and the bearing supporting member C may be provided with a passage W communicating with the port T and leading from a suitable source of lubricant. In order to insure alignment of the port T and the gap in the spring ring R, the spring ring R may be locked against relative rotation with respect to the bearing cartridge G by any suitable means, as for example, a dowel pin X shown extending with its ends in the bearing cartridge G and the split ring R respectively.

In assembly of the device, the dowel pin X is placed in position in the bearing cartridge G and the split ring R disposed in the groove S in position to be engaged by the pin X. The complete bearings D and E may then be disposed in opposite ends of the cartridge bore F to bear with their adjacent ends against the ring R. The cartridge G, together with the bearings, may be placed on the portion H of the shaft A to rest against the shoulder J in such position that the port T registers with the passage W and the cartridge G may be interlocked with the supporting member C to prevent relative movement of these members. The split ring K is then clamped to the shaft to form an abutment for the outer end of the bearing E.

I claim:

A bearing construction comprising a hollow supporting member having a bore, a bearing cartridge in the bore having an internal annular groove and a passage opening into the groove, anti-friction bearings seated in the ends of the cartridge and having inner and outer races, a split spring-ring in the groove abutting the inner ends of the outer races to receive the thrust of the bearings and having a gap between the ends thereof to register with the passage for conveying lubricant from the passage to the bearings, and means for locking the spring-ring to the cartridge to assure registry of the gap with the passage.

KARL ALMQUIST.